Figure 1:
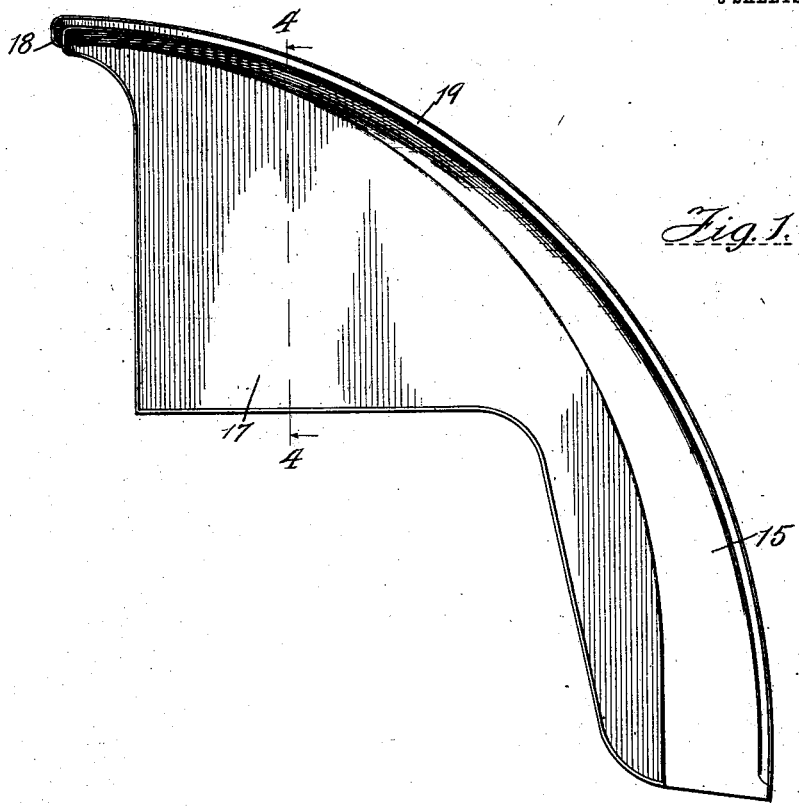

No. 886,494. PATENTED MAY 5, 1908.
W. C. GROEHN.
METALLIC FENDER AND MUD GUARD.
APPLICATION FILED MAY 24, 1907.

3 SHEETS—SHEET 1.

Witnesses:

Inventor:
William C. Groehn
By Cheever & Cox
Attys.

No. 886,494. PATENTED MAY 5, 1908.
W. C. GROEHN.
METALLIC FENDER AND MUD GUARD.
APPLICATION FILED MAY 24, 1907.
3 SHEETS—SHEET 2.
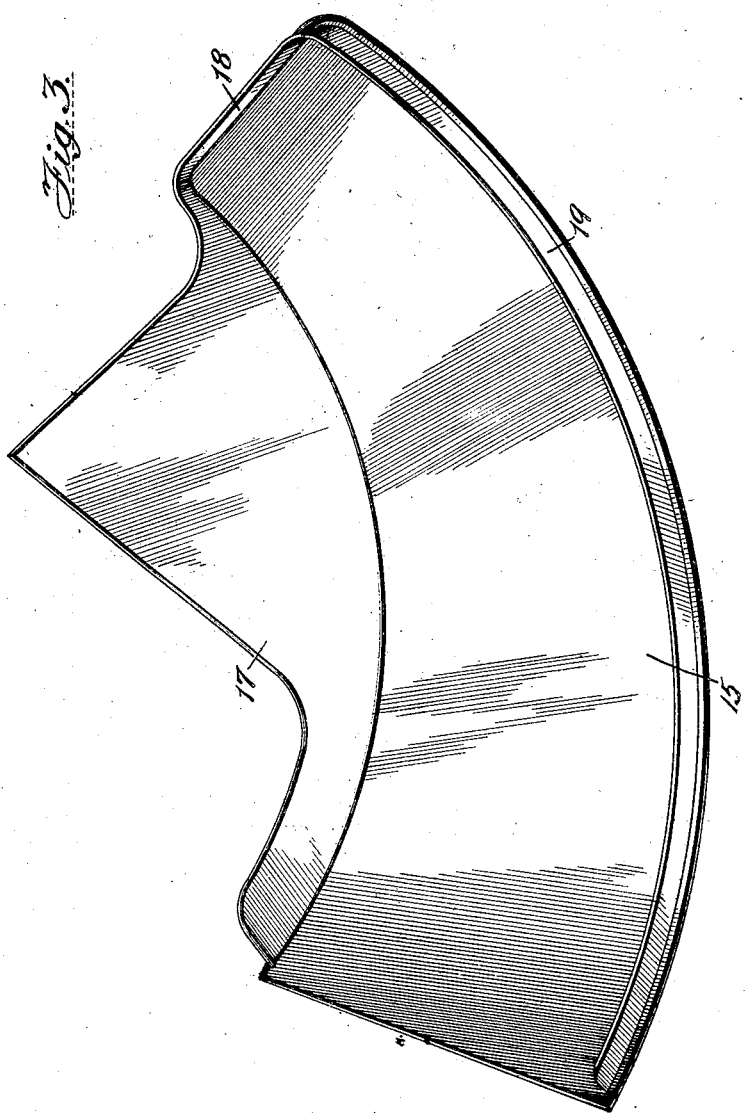

No. 886,494. PATENTED MAY 5, 1908.
W. C. GROEHN.
METALLIC FENDER AND MUD GUARD.
APPLICATION FILED MAY 24, 1907.
3 SHEETS—SHEET 3.
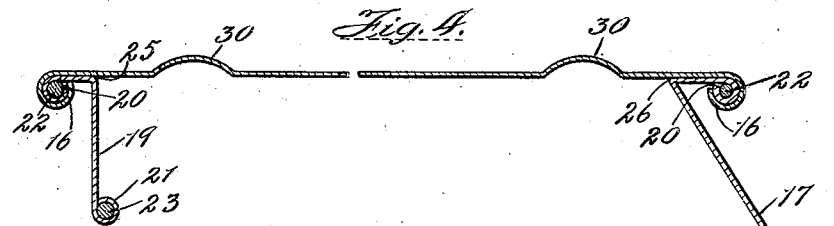
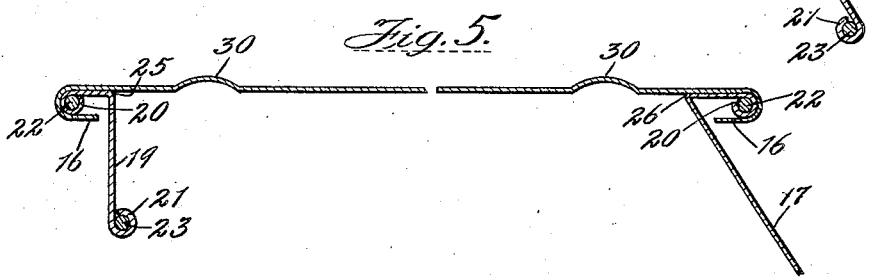
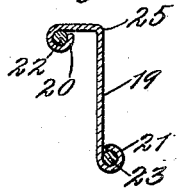
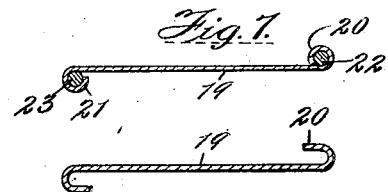
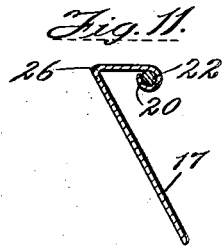
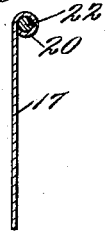
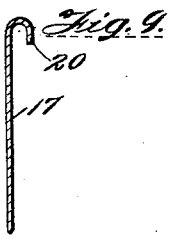
Witnesses:
Inventor:
William C. Groehn
By Cheever & Cox
Attys.

UNITED STATES PATENT OFFICE.

WILLIAM C. GROEHN, OF DETROIT, MICHIGAN, ASSIGNOR TO BRISCOE MANUFACTURING COMPANY, OF DETROIT, MICHIGAN, A CORPORATION OF MICHIGAN.

METALLIC FENDER AND MUD-GUARD.

No. 886,494.  Specification of Letters Patent.  Patented May 5, 1908.

Application filed May 24, 1907. Serial No 375,536.

*To all whom it may concern:*

Be it known that I, WILLIAM C. GROEHN, a citizen of the United States, residing at Detroit, in the county of Wayne and State of Michigan, have invented a certain new and useful Improvement in Metallic Fenders and Mud-Guards, of which the following is a specification.

The invention relates to sheet metal devices, such as hoods, fenders and mud guards, and is particularly adapted for use in connection with the wheels of carriages, automobiles, and the like.

Ordinary horse propelled carriages have for many years been equipped with plain flat leather or other light weight fenders of uniform width extending over some portion of one or more wheels for the purpose of preventing mud gathered by said wheels as the carriage moves along being thrown upon the occupants of the carriage, and against portions of the carriage decorations, which might be rendered unsightly or be more or less injured thereby. With the coming in of the automobile and its greatly increased speed over that of carriages and its use of smaller wheels which, even when the machine is running at the speed of a carriage, make more revolutions going a given distance than the larger wheels of the carriage and therefore throw the mud higher, the force of the mud thrown being dependent upon the angular velocity of the rim of the wheel, it has been found desirable and necessary to provide fenders which protect a much larger area about the wheel than can be done with a simple flat fender. It has also been found necessary for obvious reasons to apply to the fender proper a mud guard or apron extending down between the fender proper and the body of the machine to keep said mud from the machinery of the automobile as well as from the occupants thereof. As a few pounds additional weight of metallic fenders over leather ones are entirely immaterial for an automobile to carry and as leather and other light material fenders are apt to be injured or destroyed in many ways it has become highly desirable to make both the fender and mud guard of the automobile of metal.

In order that the combined fender and mud guard may properly perform its functions and yet not mar the appearance of the machine and yet not render certain parts adjacent to the mud guard inaccessible for repairs and the like, it is highly desirable that the fender proper be made of a somewhat irregular shape as shown in the drawings. Attempts have been made to form metallic devices of this class in two parts and rivet them together but this has proved unsatisfactory for the reason that if an insufficient quantity of rivets are put in, the parts rattle while if a larger quantity of rivets are inserted they are unsightly; furthermore it is almost impossible to satisfactorily enamel the portions where the rivets appear so that a smooth artistic finish is presented.

The object of this invention is to so unite a metallic fender proper, with a metallic mud guard or apron, with or without portions of material connected therewith, designed to reinforce and stiffen the fender proper so that the jointed connection shall be very rigid and a serviceable combined fender and mud guard is produced which does away with substantially all of the disadvantages above mentioned. This both when the fender proper is a plain parallel edged surface and when it is made of an irregular shape such as is shown in the drawings.

The invention consists in such a device wherein two adjacent edges of the fender proper and mud guard are wrapped about each other and usually about a wire forming the margin or edge of one of them, this more particularly where the mud guard or apron is bent at a sharp angle near its edge and near enough to the line of juncture between said fender and mud guard proper so that the apron serves as a stiffener for the fender.

It also consists in making said angular bend in the apron far enough away from the common wire border of juncture so that a tool designed to wrap the metal of one of the members about the portion of the other about said wire may operate conveniently and efficiently.

The invention further consists in the combined fender and mud guard thus constructed as an article of manufacture.

Figure 2:
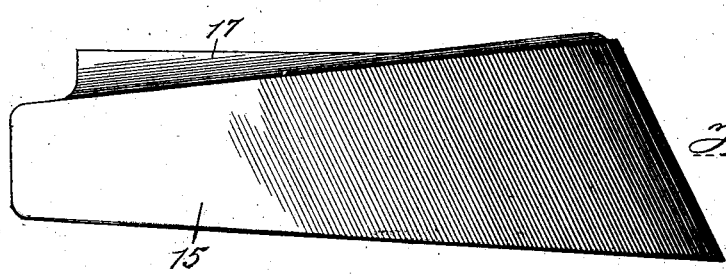

Referring to the drawings Figure 1 is a side view of a combined fender and mud guard illustrating the preferred form of the invention taken slightly below the upper surface of the fender and looking under it toward the guard. Fig. 2 is a plan view of the parts illustrated in Fig. 1. Fig. 3 is an inverted perspective view of the device. Fig. 4 is an enlarged sectional detail view taken approximately on line 4,—4 of Fig. 1 showing the positions of the various parts of the completed device. Fig. 5 is a view corresponding to Fig. 4 showing the parts in the position which they assume just before the fourth or final operation of putting them together is performed. Figs. 6, 7 and 8 are detail views of a stiffening and somewhat decorative member preferably made integral with the mud guard or apron proper in various stages of construction prior to being attached to the fender. Figs. 9, 10 and 11 are corresponding views of the metallic mud guard or apron proper before its attachment to the fender proper.

In the construction of the device of this invention a fender member 15 is provided of the desired form such as that shown in Fig. 2. The edges 16 of this fender member proper are run through a suitable set of rolls in a suitable machine one form of which is illustrated in Fig. 1 of the companion application, Serial No. 375,537 (Case B) and bent to the position shown in Fig. 5.

A mud guard or apron member 17 is next cut from flat metal, having preferably integral with it the portions 18 and 19 adapted to be connected to the fender proper simultaneously with the mud guard, the whole piece 17—18—19 being cut in the flat of such a shape that it will when applied to the fender proper make the combined fender and mud guard illustrated in the drawings. The operator now takes this piece 17—18—19 and passes both its upper and lower edges 20 and 21 respectively through the machine and rolls above referred to and thus bends them to the position shown in Figs. 6 and 9 respectively. The operator now inserts within the hooked or looped portions adjacent to the upper edges 20, of the member 17—18—19 a wire 22 or other suitable core and again passes it through said machine of the companion case using the rolls of Fig. 5 and forces the metal adjacent to said wire 22 around the wire as shown. The operator now inserts another wire 23 inside the metal edge 21 on to the lower edge of the member 17—18—19, and passes the same through the same rolls thereby twisting the lower edge of said apron member around said wire 23 as shown. It will be noticed that the wires 22 and 23 are on opposite sides of the metal forming the apron so as to stiffen same as much as possible.

The operator now takes the wire margined member, 17—18—19 and by running it repeatedly through a metal bending machine one form of which is illustrated in Fig. 3 of the companion case above mentioned bends said member into the angular forms shown, varying from the right angle 25 in the parts 18 and 19 which are to be at substantially right angles to the fender 15, to the acute angle 26 in the part 17 which is in the particular case here shown at a different angle to the fender proper. Said angular turn is preferably about one half inch from the wire bound margin of the apron member. The operator now takes the apron member and attached parts 17—18—19 and springs it inside the bend in rim 16 in the position of Fig. 5. He now takes the parts thus combined and passes the edges 16 which are about the wire 22 through the rolls and machine of the companion application, Serial No. 375,538 (Case C) which machine draws and compresses the edges 16 of the fender proper around the edges 20 and the wire 22 to the finished form of Fig. 4. The small space, about one half inch between the wire 22 and the angular turns 25 and 26 is necessary in order that the flange of the roller which completes this last operation shall be able to pass in past the walls 17, 18 and 19 and force the metal of the edges 16 into the position of Fig. 4. This distance is also important in that these angular edges make bracing or stiffening members against the under side of the fender and serve to brace the walls 17—18—19 and prevent one or all of them from buckling toward the center plane of the fender. This bending of the apron member at the angular lines 25 and 26 contracts and thickens the metal of the apron or mud guard adjacent to these lines and makes it stronger than it otherwise would be and therefore more effective as a brace, reinforcing the bracing action of the wire edge proper.

A device of this class thus constructed is almost indestructible under ordinary circumstances for the reason that it is very hard to get any mischief making instrument in a position in which the edges 16 of the fender proper can be torn from the wire or wires which they inclose. Furthermore it is, when properly enameled, practically water proof so there are no rough surfaces which fail to take enamel properly.

In Figs. 4 and 5 are shown some reinforcing corrugations or ridges 30 in the fender proper which form no part of the invention and are for convenience omitted from the other figures of the drawings.

I claim:

1. A combined fender and mud guard consisting of a metallic fender proper having an edge wrapped around a wire and a metallic mud guard member meeting said fender at an angle thereto and at a substantial distance from its wire bound edge, the material of said guard extending in engagement with the fender thence outward toward the edge of the fender and around the wire which forms its margin for the purposes set forth.

2. A metallic fender and mud guard made in two pieces the adjacent edges of both members being wrapped around a common wire, the one of said members meeting the other at an angle thereto and at a distance from said wire.

In witness whereof, I have hereunto subscribed my name in the presence of two witnesses.

WILLIAM C. GROEHN.

Witnesses:
  DWIGHT B. CHEEVER,
  JOHN A. BOYLE.